US009212640B2

(12) United States Patent
Serra et al.

(10) Patent No.: US 9,212,640 B2
(45) **Date of Patent: *Dec. 15, 2015**

(54) METHOD FOR DETERMINING THE INJECTION LAW OF A FUEL INJECTOR USING A ROLLER-TEST BENCH

(75) Inventors: Gabriele Serra, S. Lazzaro di Savena (IT); Marco Parotto, Bologna (IT)

(73) Assignee: MAGNETI MARELLI S.P.A., Corbetta (IT)

( * ) Notice: Subject to any disclaimer, the term of this patent is extended or adjusted under 35 U.S.C. 154(b) by 902 days.

This patent is subject to a terminal disclaimer.

(21) Appl. No.: 13/293,793

(22) Filed: Nov. 10, 2011

(65) Prior Publication Data

US 2012/0123703 A1 May 17, 2012

(30) Foreign Application Priority Data

Nov. 10, 2010 (IT) .............................. BO2010A0680

(51) Int. Cl.
*G01L 13/00* (2006.01)
*F02M 65/00* (2006.01)
*F02D 41/24* (2006.01)
*F02D 41/40* (2006.01)
(Continued)

(52) U.S. Cl.
CPC ......... *F02M 65/003* (2013.01); *F02D 41/2432* (2013.01); *F02D 41/2467* (2013.01); *F02M 65/001* (2013.01); *F02D 41/0087* (2013.01); *F02D 41/247* (2013.01); *F02D 41/3836* (2013.01); *F02D 41/40* (2013.01); *F02D 2200/0602* (2013.01)

(58) Field of Classification Search
USPC ........................................................... 702/47
See application file for complete search history.

(56) References Cited

U.S. PATENT DOCUMENTS

| | | | | |
|---|---|---|---|---|
| 3,498,122 | A * | 3/1970 | Odier et al. | 73/116.06 |
| 3,734,068 | A * | 5/1973 | Reddy | 123/485 |
| 6,250,285 | B1 * | 6/2001 | Takase | 123/456 |

(Continued)

FOREIGN PATENT DOCUMENTS

| | | | |
|---|---|---|---|
| DE | 102008043411 | A1 | 5/2010 |
| EP | 0488362 | A2 | 6/1992 |

(Continued)

OTHER PUBLICATIONS

Jul. 11, 2011 Search Report for Italian Patent App. No. 8020100680.

*Primary Examiner* — Paul D Lee
(74) *Attorney, Agent, or Firm* — Howard & Howard Attorneys PLLC

(57) ABSTRACT

A method determines an injection law of a fuel injector to be tested in an injection system and includes steps of: completely interrupting feeding of fuel from a fuel pump to a common rail; avoiding opening of all injectors except for one to be tested; measuring initial pressure of the fuel inside the rail before starting the opening of the injector; opening the injector for consecutive openings with a same test-actuation time; measuring final pressure after ending the opening; determining a pressure drop in the rail during the opening (equal to a difference between the initial and final pressures); estimating, according to the pressure drop, a fuel quantity that is actually injected by the injector when the injector is opened for the time; and causing an internal-combustion engine using the system to rotate by an external actuator during the openings to allow execution of consecutive openings with the same time.

13 Claims, 9 Drawing Sheets

(51) Int. Cl.

| | |
|---|---|
| *F02D 41/00* | (2006.01) |
| *F02D 41/38* | (2006.01) |

(56) References Cited

U.S. PATENT DOCUMENTS

| | | | | |
|---|---|---|---|---|
| 6,401,703 | B1 * | 6/2002 | Mamiya et al. | 123/674 |
| 6,598,469 | B2 * | 7/2003 | Shimoyama et al. | 73/114.24 |
| 7,841,319 | B2 * | 11/2010 | Thomas | 123/478 |
| 2004/0000288 | A1 * | 1/2004 | Puckett | 123/446 |
| 2004/0011325 | A1 * | 1/2004 | Benson et al. | 123/299 |
| 2008/0120962 | A1 * | 5/2008 | Okugawa et al. | 60/274 |
| 2009/0042690 | A1 * | 2/2009 | Tabata et al. | 477/5 |
| 2009/0112444 | A1 * | 4/2009 | Ishizuka et al. | 701/105 |
| 2009/0164086 | A1 | 6/2009 | Geveci et al. | |
| 2010/0125019 | A1 * | 5/2010 | Tabata et al. | 477/3 |
| 2010/0199951 | A1 | 8/2010 | Cinpinski et al. | |
| 2010/0251809 | A1 * | 10/2010 | Migueis et al. | 73/114.51 |

FOREIGN PATENT DOCUMENTS

| | | | |
|---|---|---|---|
| EP | 1619384 | A2 | 1/2006 |
| EP | 2236809 | A2 | 10/2010 |
| GB | 2449161 | A | 11/2008 |

* cited by examiner

METHOD FOR DETERMINING THE INJECTION LAW OF A FUEL INJECTOR USING A ROLLER-TEST BENCH

REFERENCE TO RELATED APPLICATION

This application claims benefit of the filing date of and priority to Italian Patent Application BO2010A 000680 filed on Nov. 10, 2010.

BACKGROUND OF INVENTION

1. Field of Invention

The invention relates, generally, to a method for determining an injection law of a fuel injector (i.e., for determining a law that binds actuation time to quantity of injected fuel) and, particularly, for determining such law using a roller-test bench.

2. Description of Related Art

An electromagnetic fuel injector (e.g., of the type described in Patent Application EP1619384A2) includes a cylindrical tubular body having a central feeding channel, which performs the fuel-conveying function, and ends with an injection nozzle regulated by an injection valve controlled by an electromagnetic actuator. The injection valve is provided with a pin, which is rigidly connected to a mobile keeper of the electromagnetic actuator to be displaced by the action of the electromagnetic actuator between a closing position and an opening position of the injection nozzle against the bias of a closing spring, which pushes the pin into the closing position. The valve seat is defined by a sealing element, which is disc-shaped, inferiorly and fluid-tightly closes the central duct of the supporting body and is crossed by the injection nozzle. The electromagnetic actuator includes a coil, which is arranged externally about the tubular body, and a fixed magnetic pole, which is made of ferromagnetic material and is arranged within the tubular body to magnetically attract the mobile keeper.

Normally, the injection valve is closed by effect of the closing spring that pushes the pin into the closing position in which the pin presses against a valve seat of the injection valve and the mobile keeper is distanced from the fixed magnetic pole. To open the injection valve (i.e., to move the pin from the closing position to the opening position), the coil of the electromagnetic actuator is energized so as to generate a magnetic field that attracts the mobile keeper towards the fixed magnetic pole against the elastic bias exerted by the closing spring (during the opening step, the stroke of the mobile keeper stops when the mobile keeper itself strikes the fixed magnetic pole).

In use, the electronic-control unit (ECU) of the engine determines the fuel quantity to be injected for each injector and, thus, by using the injection law, determines the corresponding actuation time for which the injector must be maintained open to deliver exactly the fuel quantity to be injected. Obviously, all injection-law errors (i.e., deviations of the estimated injection law that is stored in the electronic-control unit of the engine from the actual-injection law) directly affect the fuel quantity that is injected, determining a difference between the desired combustion and the actual combustion (with a potential increase of fuel consumption and a potential increase of generation of polluting substances).

Currently, a nominal-injection law of the injectors is stored in the electronic-control unit of the engine, but obviously the actual-injection law of each injector differs by a more or lesser extent from the nominal-injection law by effect of constructive tolerance and by effect of the deviation over time due to "aging" phenomena. In particular, an electromagnetic fuel injector displays a high dispersion of the injection features from injector to injector in a ballistic-operation area corresponding to short actuation times and, thus, small quantities of injected fuel. The manufacturers of controlled-ignition internal-combustion engines (i.e., working according to the "Otto" cycle) require electromagnetic fuel injectors capable of injecting small quantities of fuel (in the order of 1 milligram) with sufficient accuracy. Such a request is due to the observation that the generation of polluting substances during combustion can be reduced by fractioning fuel injection into several distinct injections. Consequently, it must be possible to use an electromagnetic fuel injector with high accuracy also in the ballistic area because only in the ballistic area can quantities of fuel in the order of 1 milligram be injected.

To attempt to reduce the injected-fuel quantity errors, it has been suggested to reduce the admissible maximum deviations between nominal-injection law and actual-injection law, particularly in the ballistic-operation area. However, such a request implies a considerable increase in the production costs of the injectors because it obliges to use more costly material, more sophisticated machining techniques [that are ultimately more costly (essentially because of the need to use more complex and accurate machine tools)], and greater controls during and at the end of construction (with a considerable increase in the number of incomplete parts or complete rejects). The matter is further complicated by the "fuel-injector aging" phenomena that determine a deviation of injection features over time.

Thus, there is a need in the related art for a method for determining the injection law of a fuel injector that it is free from the above-described drawbacks. More specifically, there is a need in the related art for such a method that is easy and cost-effective to implement in an existing electronic-control unit.

SUMMARY OF INVENTION

The invention overcomes the disadvantages in the related art in a method for determining an injection law of a fuel injector to be tested in an injection system that includes a plurality of fuel injectors, a common rail feeding fuel under pressure to the injectors, and a fuel pump that keeps the fuel under pressure inside the common rail. The method includes steps of completely interrupting the feeding of the fuel from the fuel pump to the common rail; avoiding opening of all of the fuel injectors except for one of the fuel injectors to be tested; measuring initial pressure of the fuel inside the common rail before starting the opening of the fuel injector to be tested; opening the fuel injector to be tested for a number of consecutive openings with a same test-actuation time; measuring final pressure of the fuel inside the common rail after ending the opening of the fuel injector to be tested; determining a pressure drop in the common rail during the opening of the fuel injector to be tested, which is equal to a difference between the initial pressure and final pressure; estimating, according to the pressure drop in the common rail, a fuel quantity that is actually injected by the fuel injector to be tested when the fuel injector is opened for the test-actuation time; and causing an internal-combustion engine using the injection system to rotate by an external actuator during the openings of the fuel injector to be tested to allow execution of a high number of consecutive openings of the fuel injector to be tested with the same test-actuation time.

One advantage of the method for determining an injection law of a fuel injector of the invention is that is free from the drawbacks of the methods of the related art.

Another advantage of the method for determining an injection law of a fuel injector of the invention is that it is easy and cost-effective to implement in an existing electronic-control unit.

Another advantage of the method for determining an injection law of a fuel injector of the invention is that it allows to identify with high accuracy the actual-injection law and, thus, allows to use the actual-injection law to control the combustion of the internal-combustion engine.

Another advantage of the method for determining an injection law of a fuel injector of the invention is that the combustion control of the internal-combustion engine is very accurate in all engine points and, particularly, in the ballistic-operation area "B."

Another advantage of the method for determining an injection law of a fuel injector of the invention is that the fuel injection accuracy is reached by virtue of the possibility of knowing the corresponding actual-injection law (that may display a deviation even relatively high of the nominal-injection law) for each injector.

Another advantage of the method for determining an injection law of a fuel injector of the invention is that no additional hardware is needed with respect to that normally present in the fuel-injection systems and high-calculation power and large memory capacity are not needed.

Other objects, features, and advantages of the method for determining an injection law of a fuel injector of the invention are readily appreciated as the method become more understood while the subsequent detailed description of at least one embodiment of the method is read taken in conjunction with the accompanying drawing thereof.

BRIEF DESCRIPTION OF EACH FIGURE OF DRAWING

DETAILED DESCRIPTION OF EMBODIMENT(S) OF INVENTION

Figure 1:
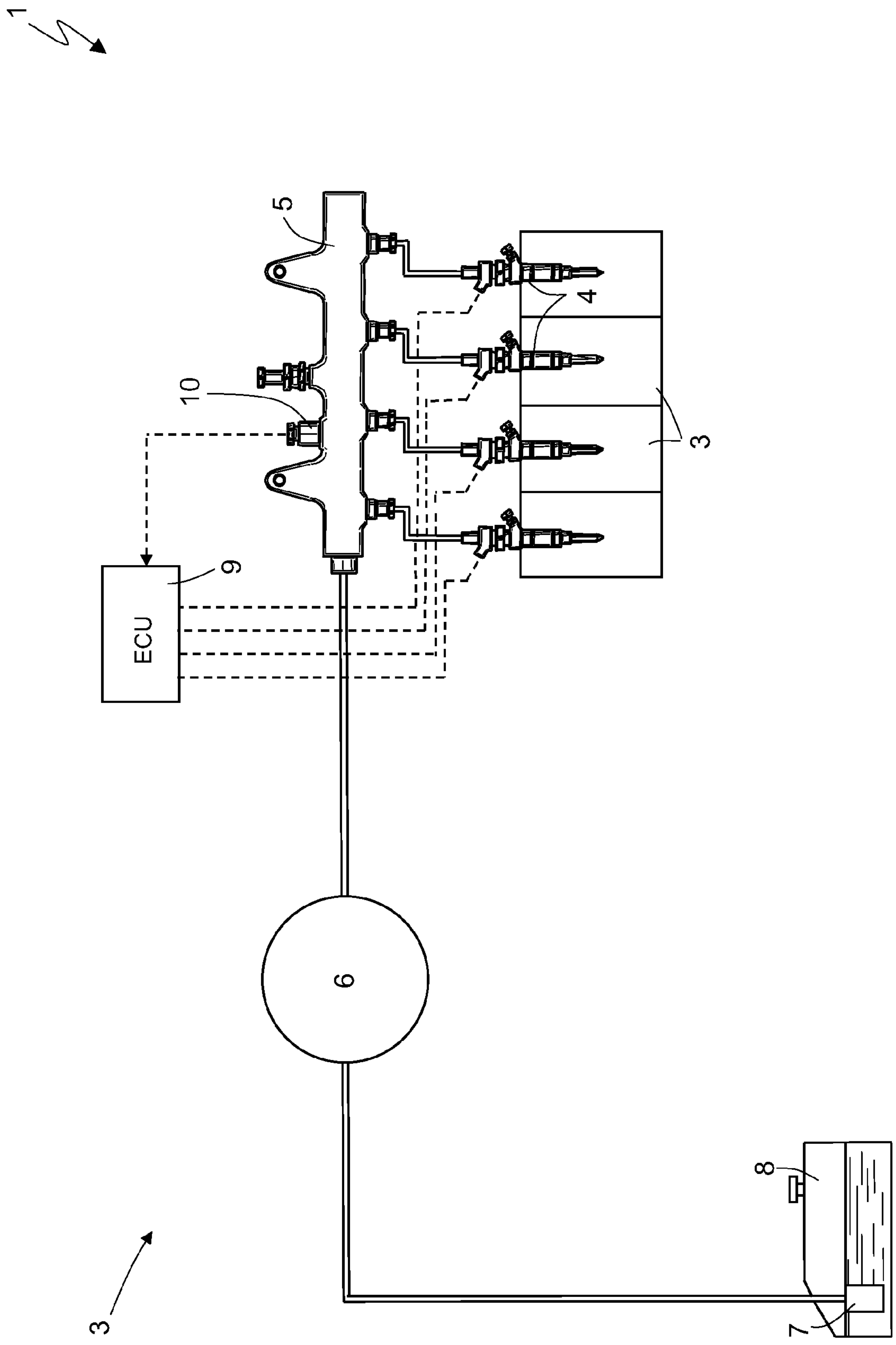
FIG. 1 is a diagrammatical view of an internal-combustion engine provided with a common rail-type injection system in which a method for determining the injection law of the injectors of the invention is applied.

In FIG. 1, an internal-combustion engine is generally indicated at 1 and provided with four cylinders 2 and a common rail-type injection system 3 for direct injection of fuel into the cylinders 2 themselves. The injection system 3 includes four electromagnetic fuel injectors 4, each of which injects fuel directly into a respective cylinder 2 of the engine 1 and receives pressurized fuel from a common rail 5. The injection system 3 includes a high-pressure pump 6, which feds fuel to the common rail 5 and is actuated directly by a driving shaft of the internal-combustion engine 1 by a mechanical transmission, the actuation frequency of which is directly proportional to the rotation speed of the driving shaft. In turn, the high-pressure pump 6 is fed by a low-pressure pump 7 arranged within the fuel tank 8.

Each injector 4 injects a variable fuel quantity into the corresponding cylinder 2 under the control of an electronic-control unit 9 (ECU). The common rail 5 is provided with a pressure sensor 10, which measures the fuel pressure P in the common rail 5 itself and communicates with the electronic-control unit 9.

Figure 2:
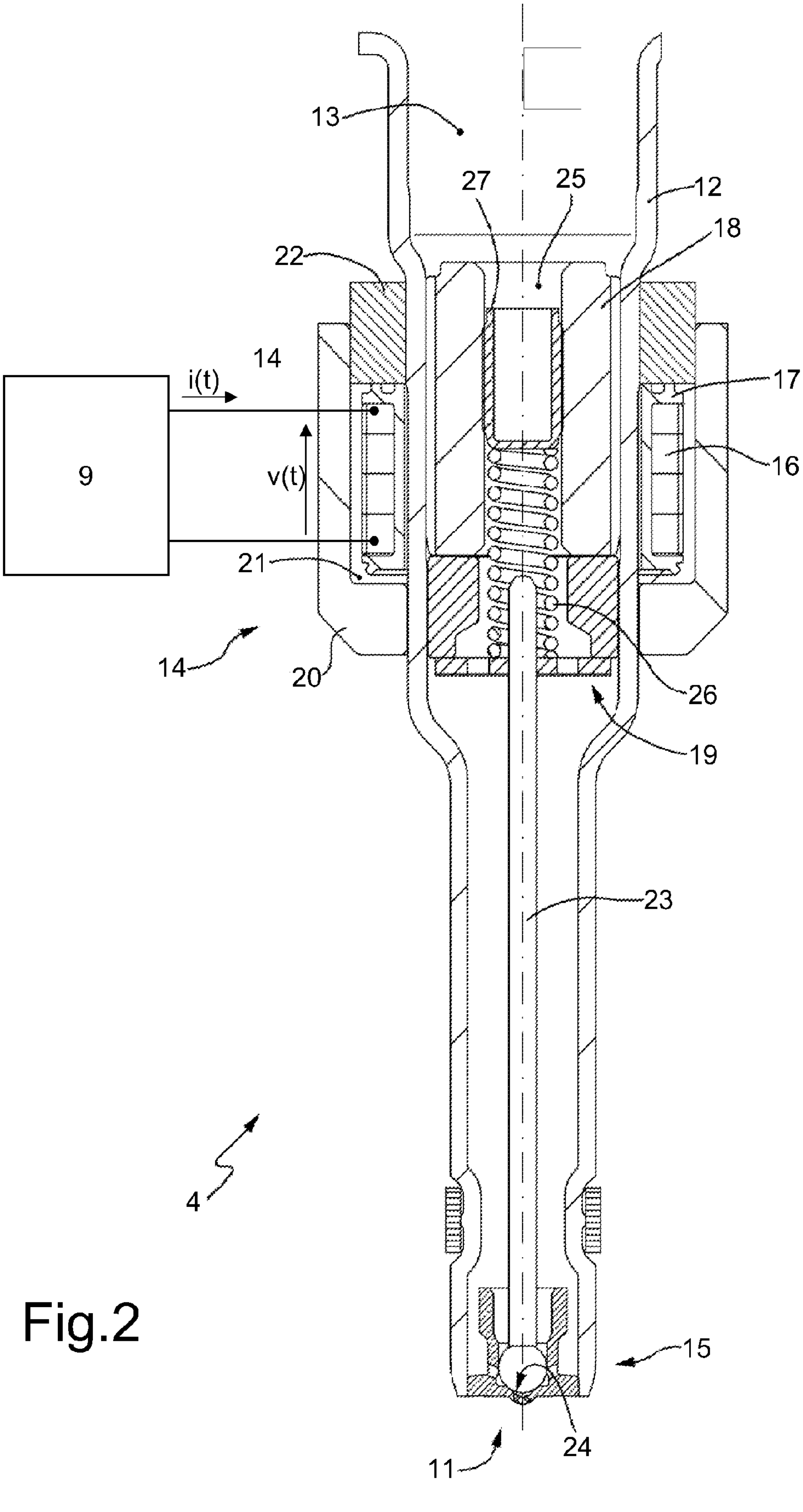
FIG. 2 is a diagrammatical, side elevational and sectional view of an electromagnetic fuel injector of the injection system of FIG. 1.

As shown in FIG. 2, each fuel injector 4 substantially has a cylindrical symmetry about a longitudinal axis and is controlled to inject fuel from an injection nozzle 11. The injector 4 includes a supporting body 12, which has a variable section cylindrical tubular shape along longitudinal axis, and a feeding duct 13 extending along the entire length of supporting body 12 itself to feed pressurized fuel towards injection nozzle 11. The supporting body 12 supports an electromagnetic actuator 14 at an upper portion thereof and an injection valve 15 at a lower portion thereof, which valve inferiorly delimits the feeding duct 13. In use, the injection valve 15 is actuated by the electromagnetic actuator 14 to regulate the fuel flow through the injection nozzle 11, which is obtained at the injection valve 15 itself.

The electromagnetic actuator 14 includes a coil 16, which is arranged externally around tubular body 12 and is enclosed in a plastic-material toroidal case 17, and a fixed magnetic pole 18 (also called "bottom"), which is formed by ferromagnetic material and is arranged within the tubular body 12 at the coil 16. Furthermore, the electromagnetic actuator 15 includes a mobile keeper 19, which has a cylindrical shape, is made of ferromagnetic material, and is adapted to be magnetically attracted by the magnetic pole 18 when the coil 16 is energized (i.e., when current flows through it). Finally, the electromagnetic actuator 15 includes a tubular magnetic casing 20, which is made of ferromagnetic material, is arranged outside the tubular body 12, and includes an annular seat 21 for accommodating the coil 16 therein and a ring-shaped magnetic washer 22 that is made of ferromagnetic material and arranged over the coil 16 to guide the closing of the magnetic flux about the coil 16 itself.

The mobile keeper 19 is part of a mobile plunger, which further includes a shutter or pin 23 having an upper portion integral with the mobile keeper 19 and a lower portion cooperating with a valve seat 24 of the injection valve 15 to adjust the fuel flow through the injection nozzle 11 in the known manner. In particular, the pin 23 ends with a substantially spherical shutter head that is adapted to fluid-tightly rest against the valve seat.

The magnetic pole 18 is centrally perforated and has a central through-hole 25 in which the closing spring 26, which pushes the mobile keeper 19 towards a closing position of the injection valve 15, is partially accommodated. In particular, a reference body 27, which maintains the closing spring 26 compressed against the mobile keeper 19 within the central hole 25 of the magnetic pole 18, is piloted in fixed position.

In use, when the electromagnet actuator 14 is de-energized, the mobile keeper 19 is not attracted by the magnetic pole 18, and the elastic force of the closing spring 26 pushes the mobile keeper 19 downward along with the pin 23 (i.e., the mobile plunger) to a lower-limit position in which the shutter head of the pin 23 is pressed against the valve seat 24 of the injection valve 15, isolating the injection nozzle 11 from the pressurized fuel. When the electromagnetic actuator 14 is energized, the mobile keeper 19 is magnetically attracted by the magnetic pole 18 against the elastic bias of the closing spring 26, and the mobile keeper 19 along with pin 23 (i.e., the mobile plunger) is moved upward by effect of the magnetic attraction exerted by the magnetic pole 18 itself to an upper limit position in which the mobile keeper 19 abuts against the magnetic pole 18 and the shutter head of the pin 23 is raised with respect to the valve seat 24 of the injection valve 15, allowing the pressurized fuel to flow through the injection nozzle 11.

As shown in FIG. 2, the coil 16 of the electromagnetic actuator 14 of each fuel injector 4 is supplied by the electronic-control unit 9 that applies a voltage "v(t)" variable over time to the terminals of the coil 16, which voltage determines the circulation of a current "i(t)" variable over time across the coil 16.

Figure 3:
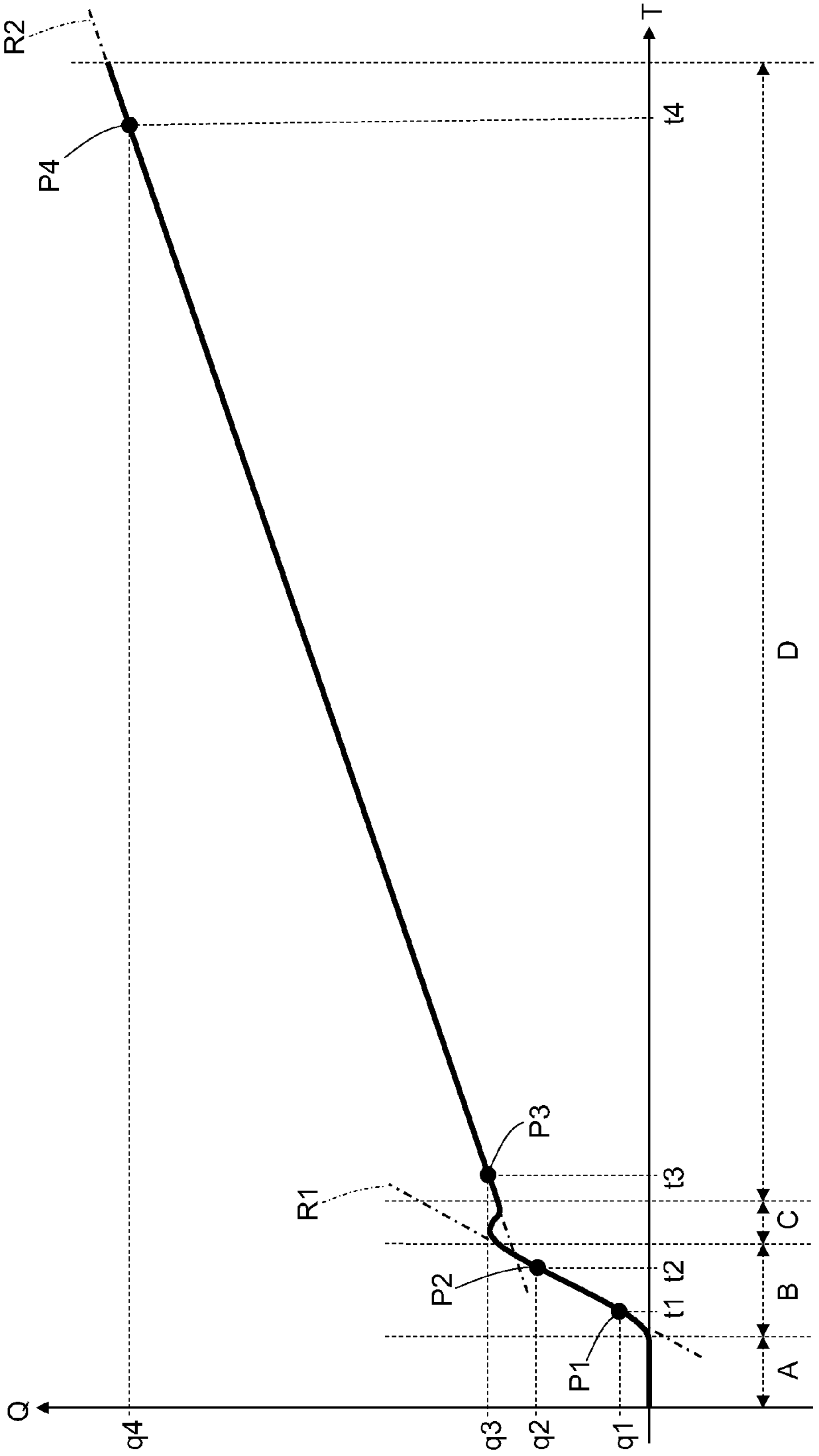
FIG. 3 is a graph illustrating the injection law of an electromagnetic fuel injector of the injection system of FIG. 1.

As shown in FIG. 3, the injection law (i.e., the law that binds the actuation time "T" to the injected-fuel quantity "Q" and is represented by the "actuation time T/injected-fuel quantity Q" curve) in each fuel injector 4 can be split into four areas:

An initial failed opening area "A" in which the actuation time "T" is too short and, thus, the energy that is supplied to the coil 16 of the electromagnetic actuator 14 produces a motive force insufficient to overcome the force of the closing spring 26 and the pin 23 remains stationary in the closing position of the injection valve 15 (in the initial area "A," the quantity of injected fuel "Q" is always zero regardless of the actuation time "T");

A ballistic area "B" in which the pin 23 moves from the closing position of the injection valve 15 to an all-open position (in which the mobile keeper 19 integral with the pin 23 is arranged abutingly against the fixed magnetic pole 18), but cannot reach the all-open position and, thus, returns to the closing position before having reached the all-open position (in the ballistic area "B," the injected-fuel quantity "Q" increases rapidly and in substantially linear manner as the actuation time "T" increases);

A linear area "D" in which the pin 23 moves from the closing position of the injection valve 15 of the all-open position that is maintained for a given time (in the linear area "D," the injected-fuel quantity "Q" increases in linear manner as the actuation time "T" increases, but with a lower gradient with respect to the ballistic area "B"); and A connection area "C" in which the pin 23 reaches the all-open position approximately at the time in which the closing starts and, thus, the behavior is strongly non-linear because it is greatly influenced by the effects of the mechanical rebound (the union area "C" connects the ballistic area "B" to the linear area "D" and is greatly non-linear, thus the use of the fuel injector 4 in this connection area "C" is not recommended).

According to an embodiment, the injection law is approximated by a line "R1" that approximates the ballistic-operation area "B" and a straight line "R2" that approximates the linear operation area "D" and intersects the straight line "R1." The straight line "R1" is identified by two characteristic points "P1," "P2" arranged on the ends of the ballistic-operation area "B," and the straight line "R2" is identified by two characteristic points "P3," "P4" arranged at the ends of the linear operation area "C." Each of the characteristic points "P1"-"P4" displays a corresponding characteristic actuation time "t1"-"t4" and a corresponding injected-fuel quantity "q1"-"q4," and the characteristic points "P1"-"P4" as a whole allow to reconstruct an adequate fidelity of the injection law of a fuel injector 4. Obviously, other embodiments that use a different number of characteristic points and/or a different distribution of characteristic points are possible. Or, further embodiments that do not use straight lines to approximate the injection law are possible (e.g., spline functions could be used). It is worth noting that a very bad approximation of connection area "C" is obtained by approximating the injection law with two straight lines "R1" and "R2," but this is not a problem because making a fuel injector 4 work in the connection area "C" is avoiding due to the great lack of linearity.

The nominal-injection law of each fuel injector 4 is initially stored in a memory of the electronic-control unit 9. In this manner, the electronic-control unit 9 determines the desired fuel quantity "Qd" for each fuel injector 4 as a function of the engine-control objectives and, thus, determines the desired actuation time "Td" for each fuel injector 4 as a function of the desired fuel quantity "Qd" using the previously stored injection law.

Figure 4:
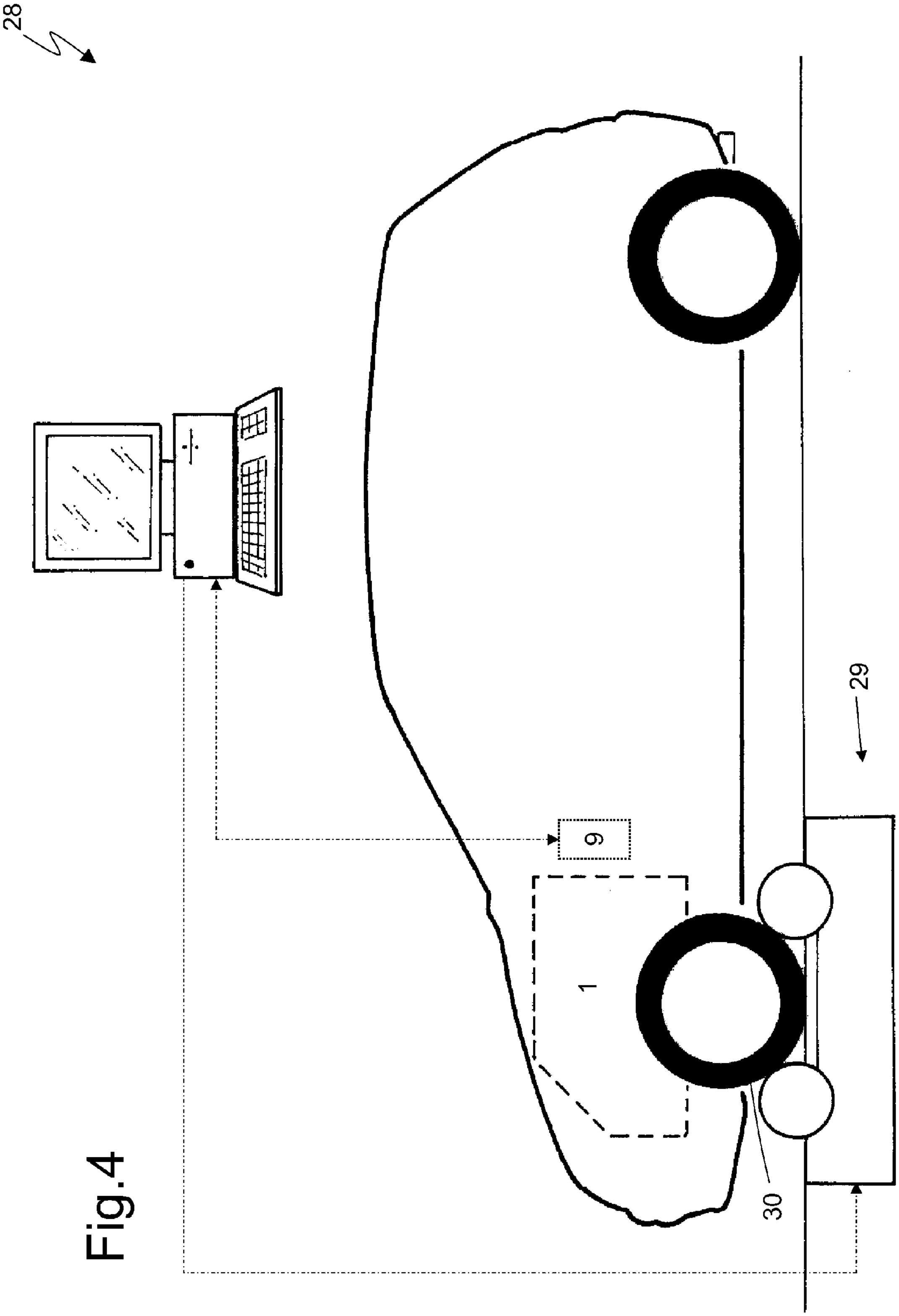
FIG. 4 is a diagrammatical view of a vehicle mounting the internal-combustion engine of FIG. 1 and mounted on a roller-test bench to execute a test at an end of a production line.

With reference to FIG. 4 and according to an embodiment of the invention, the actual-injection law of each of the four fuel injectors 4 of the internal-combustion engine 1 is determined during a step of calibration typically executed at the end of the production of a vehicle 28 that incorporates the internal-combustion engine 1. It is worth noting that this type of determination of the actual-injection law of each of the four fuel injectors 4 of the internal-combustion engine 1 may be executed at any time of life of the vehicle 28 and not only at the end of the production line (e.g., may be executed after a repair intervention that has required the replacement of one or more fuel injectors 4).

At the end of the step of calibration, in the memory of the electronic-control unit 9, the initially stored nominal-injection law of each fuel injector 4 is replaced by the corresponding actual-injection law to increase the actuation accuracy of the fuel injectors 4 (i.e., so that, in each engine point, the fuel injectors 4 inject a fuel quantity as close as possible to the fuel quantity required by the engine control).

Initially, the vehicle 28 is coupled to a roller-test bench 29 so that the roller-test bench 29 can rotatably feed the drive wheels 30 of a vehicle 28 to rotatably feed the internal-combustion engine 1 (i.e., the driving shaft of the internal-combustion engine 1) at a constant, predetermined rotation speed. When the internal-combustion engine 1 is rotatably fed at a constant rotation speed by the roller-test bench 29, the electronic-control unit 9 executes a series of tests for each fuel injector 4 of the injection system 3 in sequence. In other words, the electronic-control unit 9 executes the series of tests for a first fuel injector 4, then executes the same series of tests for a second fuel injector 4, and so forth. For each fuel injector 4 to be tested, the test series requires determining in sequence the corresponding fuel quantities "Q" that are actually injected by the fuel injector 4 to be tested when it is opened for a plurality of mutually different test-actuation times "T" (that are chosen from the characteristic actuation times "t1"-"t4" as a whole). In other words, for each fuel injector 4 to be tested, the series of tests contemplates determining in sequence the corresponding fuel quantities "Q" that are actually injected by the fuel injector 4 to be tested when it is opened for the characteristic actuation times "t1"-"t4."

For each fuel injector 4 to be tested and for each actuation test time "T," the determination of the fuel quantity "Q" that is actually injected by the fuel injector 4 to be tested when it is opened for the test-actuation time "T" includes completely interrupting the fuel feeding from the fuel pump 6 to the common rail 5, avoiding the opening of all the other fuel injectors 4 besides the fuel injector 4 to be tested, and measuring the initial fuel pressure "Pi" in the common rail 5 before starting the opening of the fuel injector 4 to be tested by the pressure sensor 10. After having measured the initial fuel pressure "Pi," the electronic-control unit 9 opens the fuel injector 4 to be tested for a number "N" of consecutive openings with the same test-actuation time "T" (for example, number "N" is high and indicatively in the order of hundreds of times). After having ended the opening of the fuel injector 4 to be tested, the final fuel pressure "Pf" in the common rail 5 is measured by the pressure sensor 10. The electronic-control unit 9 determines a pressure drop "ΔP" in the common rail 5 during the opening of the fuel injector 4 to be tested equal to the difference between the initial fuel pressure "Pi" and the final fuel pressure "Pf." Finally, the electronic-control unit 9 estimates the fuel quantity that is actually injected by the fuel injector 4 to be tested when it is opened for the test-actuation time "T."

After having obtained the pressure drop "ΔP" in the common rail 5, the electronic-control unit 9 estimates the total fuel quantity that was actually injected by the fuel injector 4 during the openings with the test-actuation time "T" itself as a function of the pressure drop "ΔP" in the common rail 5 and, thus, calculating the fuel quantity "Q" that is actually injected by the fuel injector 4 to be tested when it is opened for the test-actuation time "T" by dividing the total fuel quantity by the number "N" of openings. In the most simple assumption, it is assumed that the total fuel quantity that was actually injected by the fuel injector 4 during the openings is equal to the total fuel quantity that has come out from the common rail 5. The internal volume of the common rail 5 and the compressibility modulus of the fuel being known, the dependence between total fuel quantity that has come out of the common rail 5 and the pressure drop "ΔP" in the common rail 5 can be determined in calculations or experimentally.

According to an embodiment, the fuel pump 6 is of the type described in Patent Application EP2236809A2 and includes at least one pumping chamber within which a piston runs with reciprocating motion, a suction duct regulated by a suction valve for feeding low pressure fuel into the pumping chamber, and a delivery duct regulated by a delivery valve for feeding high pressure fuel from the pumping chamber to the common rail 5 through the supply duct. Furthermore, the fuel pump 6 includes a flow adjustment device that acts on the suction valve maintaining the suction valve itself open also during the pumping phase, so that a variable part of the fuel present in the pumping chamber and in excess with respect to the actual feeding need of the common rail 5 returns into the suction duct and is not pumped towards the common rail 5 through the feeding duct. To completely interrupt the fuel feed from the fuel pump 6 to the common rail 5, the adjustment device is actuated to maintain the intake valve always open (obviously, in the case of normally open intake valve the adjustment device is never activated to allow the closing of the intake valve). In this manner, the feeding of fuel from the fuel pump 6 to the common rail 5 is completely cancelled out.

In the case of electromagnetic fuel injectors 4 (typically used for the injection of petrol at medium pressure), in absence of openings of the fuel injectors 4 the common rail 5 does not display significant leakages of fuel. Furthermore, the electromagnetic fuel injectors 4 do not "consume" fuel for their actuation (i.e., for their actuation they do not discharge part of the pressurized fuel present in the common rail 5 towards the low pressure tank). Consequently, in the case of electromagnetic fuel injectors 4, it can be assumed without committing appreciable errors that all the fuel that has come out from the common rail 5 during the openings of the fuel injector 4 to be tested was injected by the fuel injector 4 to be tested itself.

Instead, in the case of hydraulic fuel injectors 4 (typically used for injecting diesel at very high pressure) the common rail 5 displays non negligible losses (leakages) of fuel. Furthermore, the hydraulic fuel injectors 4 "consume" fuel for their actuation (i.e., discharge part of the pressurized fuel present in the common rail 5 towards a low pressure tank for their actuation). Consequently, in the case of hydraulic fuel injectors 4, it may be necessary to estimate the quantity of fuel that is lost due to leakages and/or actuation of the common rail 5 during the openings of the fuel injector 4 to be tested itself (the fuel leakages may occur not only in the fuel injector 4 to be tested but also in the other inactive fuel injectors 4). Thus, after estimated a gross fuel quantity "Q" that has come out from the common rail 5 during the openings of the fuel injector 4 to be tested as a function of the pressure drop "ΔP" in the common rail 5, the total fuel quantity "Q" that is actually injected by the fuel injector 4 to be tested during the openings of the fuel injector 4 to be tested can be calculated by subtracting the quantity of loss fuel from the gross fuel quantity "Q."

According to an embodiment, the quantity of lost fuel is estimated as a function of the fuel pressure in the common rail 5. In particular, a first contribution, which estimates the loss by leakage and is directly proportional to the duration of the interval of time elapsing between the two measurements of the fuel pressure in the common rail 5, is determined, a second contribution, which estimates the leakages by actuation and is directly proportional to the number "N" of openings of the fuel injector 4 to be tested, is determined, and finally the fuel quantity lost is established by adding the two contributions.

According to an embodiment, a first predetermined interval of time (of the indicative duration of a few milliseconds) is waited between the fuel feed interrupted by the fuel pump 6 to the common rail 5 and the measurement of the initial fuel pressure "Pi" in the common rail 5 to obtain a stabilization of the pressure and, thus, to improve measurement accuracy. Similarly, a second predetermined interval of time (of the initial duration of a few milliseconds) is waited between the end of the opening of the fuel injector 4 to be tested and the measurement of the final fuel pressure "Pf" in the common rail 5 to obtain the stabilization of the pressure and, thus, improve the measurement accuracy.

As previously mentioned, the roller-test bench 29 rotatably drives the internal-combustion engine 1 at a constant rotation speed for the entire duration of the above described series of tests for all the fuel injectors 4. Indeed, by virtue of the fact that the rotation speed of the internal-combustion engine 1 is maintained constant by the roller-test bench 29, the fuel that is injected exclusively by the fuel injector 4 to be tested is "dimensioned" exclusively as a function of efficiency (i.e., of rapidity) and of efficacy (i.e., of accuracy) of the tests and it is not necessary for the fuel that is injected exclusively by the fuel injector 4 to be tested to be "dimensioned" as a function of the motion needs of the internal-combustion engine 1. In this manner, the tests may be executed rapidly and in optimal conditions. The roller-test bench 29 may be called to supply torque to the driving wheels 30 when the internal-combustion engine 1 tends to slow down with respect to the predetermined rotation speed (it is working with only one cylinder 2 at a time, thus the torque generated by only one cylinder 2 could be insufficient to maintain the internal-combustion engine 1 rotating), or alternatively the roller-test bench 29 could be called to absorb torque from the driving wheels 30 when the internal-combustion engine 1 tends to accelerate with respect to the predetermined rotation speed [typically when the test-actuation time "T" is close to the maximum (i.e., for characteristic point "t4")]. It is worth noting that it is not strictly necessary for the rotation speed of the internal-combustion engine 1 to be always constant during the execution of the tests on the fuel injectors 4, but in all cases maintaining the rotation speed of the internal-combustion engine 1 constant while executing tests on the fuel injectors 4 contributes to controlling and reducing measurement errors.

By virtue of the presence of the roller-test bench 29, for each estimate (i.e., for each observation) it is possible to execute a high number "N" of consecutive openings of the fuel injector 4 to be tested with the same test-actuation time. In this manner, the pressure drop "ΔP" in the common rail 5 during the opening of the fuel injector 4 to be tested is high and, thus, its determination may be very accurate (because the pressure drop "ΔP" is much higher than the errors of the pressure sensor 10, the hydraulic and electric background noise, and the minimum resolution at which the electronic-control unit 9 reads the output of the pressure sensor 10).

Figure 5:
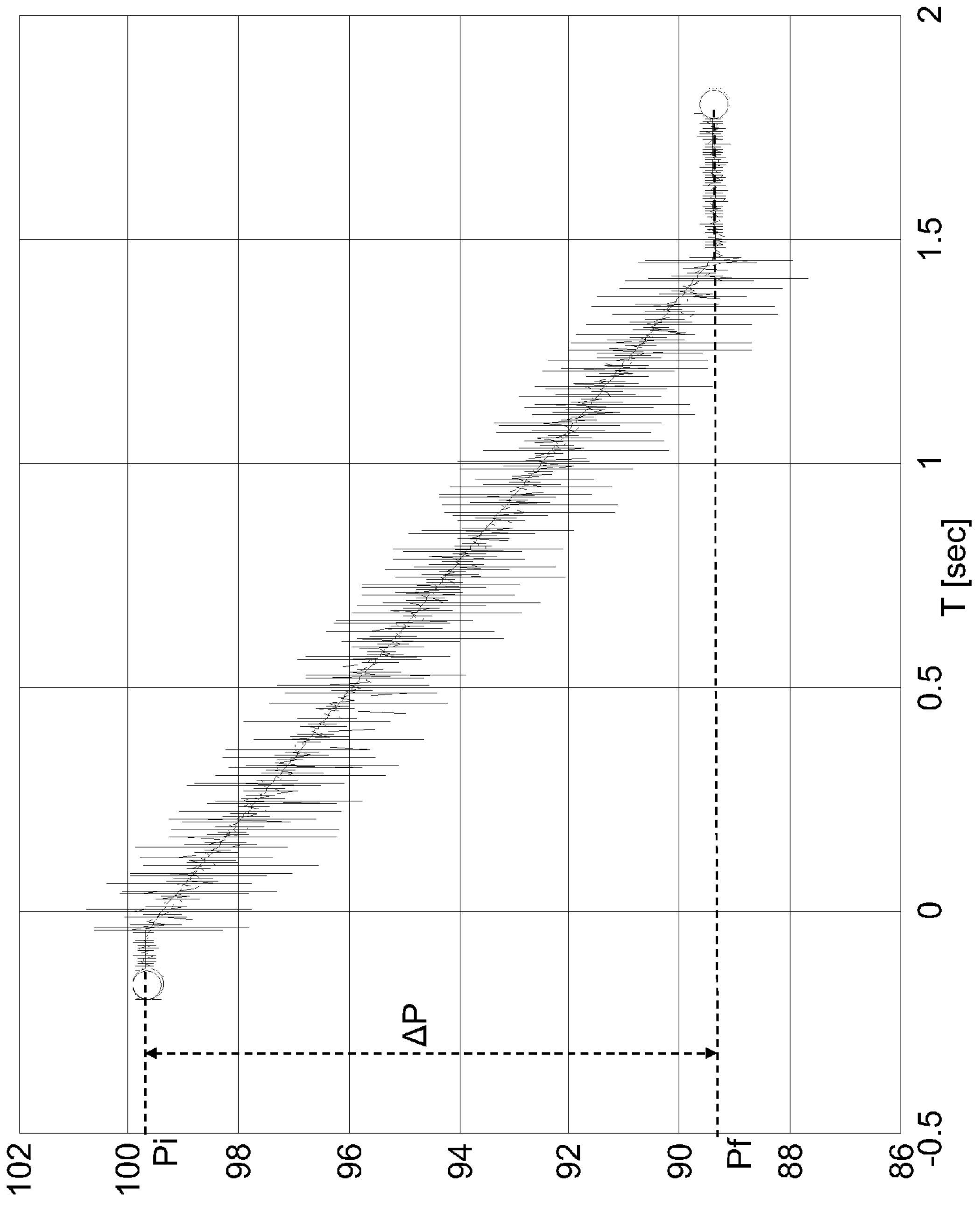
FIG. 5 is a graph illustrating evolution over time of pressure in a common rail of the injection system of FIG. 1 during the test at the end of the production line.
Figure 6:
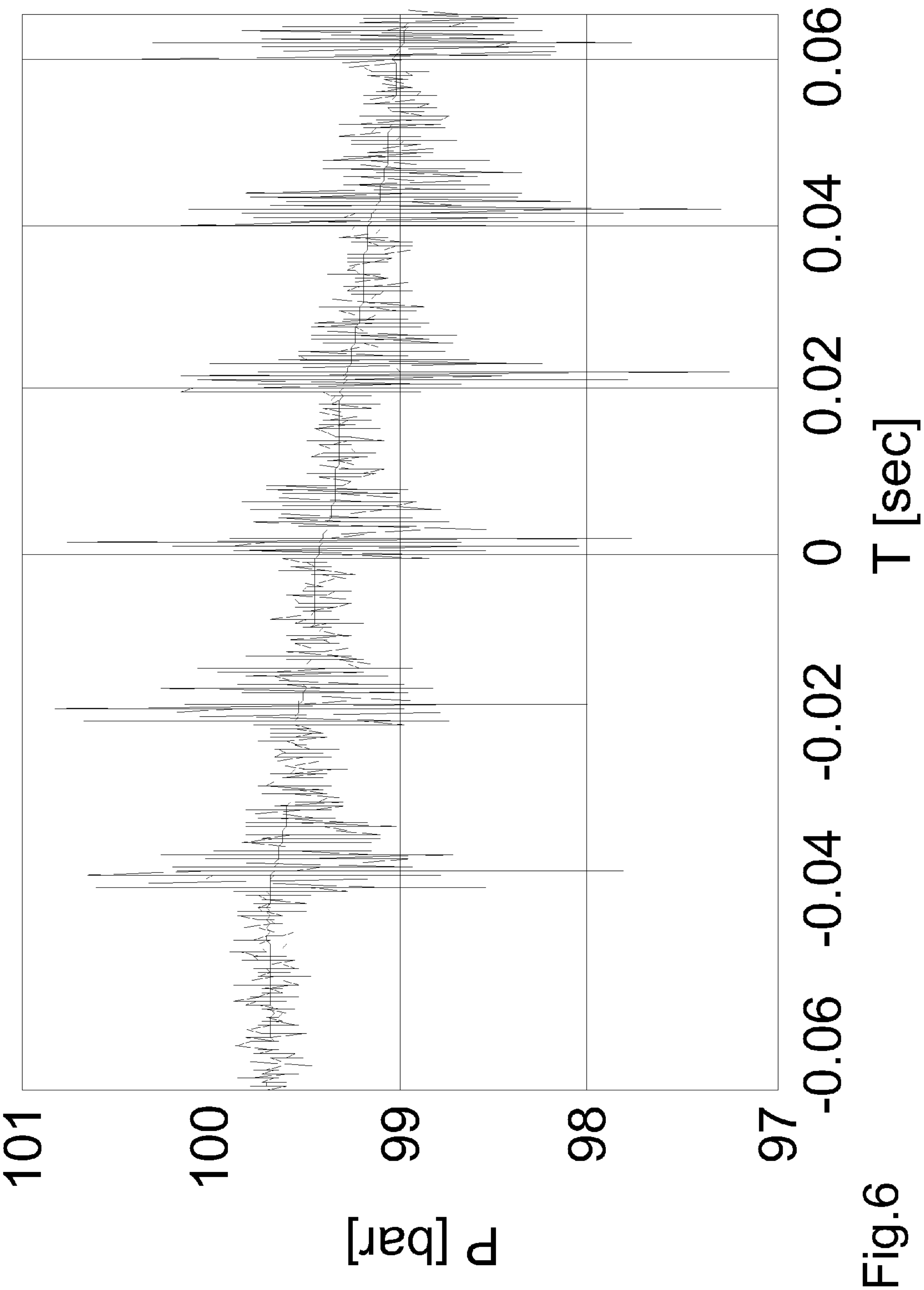
FIG. 6 is an enlarged scale view of a detail of the graph of FIG. 5.

FIG. 5 shows an example of the evolution of the fuel pressure in the common rail 5 during the estimate of the fuel quantity "Q" that is actually injected by the fuel injector 4 to be tested when it is opened for a test-actuation time "T." FIG. 5 clearly shows the pressure drop "ΔP" in the common rail 5 by effect of the repeated openings of the fuel injector 4 to be tested. In particular, FIG. 5 refers to approximately 75 consecutive openings of the fuel injector 4 to be tested with a same test-actuation time "T." FIG. 5, and, in particular the enlarged detail in FIG. 6, shows that the fuel pressure in the common rail 5 is subjected to a pulse oscillation that is rapidly damped at each opening of the fuel injector 4 to be tested.

Obviously, the aforesaid method for determining the injection laws of the fuel injectors 4 only applies in particular conditions [i.e., when the vehicle 28 is in a suitable, protected measuring environment (typically at the end of the production line but also in an authorized workshop)]. A different method for determining the injection laws of the fuel injectors 4, which is instead applied during the normal use of the internal-combustion engine 1, is described below.

During the normal use of the internal-combustion engine 1, the electronic-control unit 9 continues to determine the actual-injection laws of the fuel injectors 4 so as to follow the time deviations (obviously, if the actual-injection laws were determined at the end of the production line of the vehicle 28, as described above) or for determining the actual-injection laws for the first time (obviously, if the actual-injection laws were not determined at the end of the production line of the vehicle 28, as described above).

As previously mentioned, determining the actual-injection law of a fuel injector 4 to be tested means determining the characteristic points "P1"-"P4" of the injection law, thus means determining the fuel quantity "Q" that is actually injected by the fuel injector 4 to be tested when opened for a test-actuation time "T" equal to the corresponding characteristic actuation time "t1"-"t4" for each characteristic point "P1"-"P4."

The method for estimating the fuel quantity "Q" that is actually injected by the fuel injector 4 to be tested when it is opened for a test-actuation time "T" are entirely similar to that described above: the electronic-control unit 9 completely interrupts the fuel feed from the fuel pump 6 to the common rail 5, avoids the opening of all other fuel injectors 4 besides the fuel injector 4 to be tested, measures (after having waited for the first predetermined time interval) the initial fuel pressure "Pi" of the fuel in the common rail 5 before starting the opening of the fuel injector 4 to be tested, opens the fuel injector 4 to be tested for a number "N" of consecutive openings with the same test-actuation time "T," and finally measures (after having waited for the second predetermined time interval) the final pressure "Pf" of the fuel in the common rail 5 after having ended the opening of the fuel injector 4 to be tested. At the end of the two pressure measurements, the electronic-control unit 9 determines the pressure drop "ΔP" in the common rail 5 during the opening of the fuel injector 4 to be tested and, thus, estimates the fuel quantity "Q" that is actually injected by the fuel injector 4 to be tested when is opened for the test-actuation time "T" as a function of the pressure drop "ΔP" in the common rail 5.

It is worth noting that an estimate of the fuel quantity "Q" concerns only one fuel injector 4 to be tested at a time, while all the other three fuel injectors 4 work normally in the same injection cycle. Obviously, during the estimate of the fuel quantity "Q" that is actually injected by the fuel injector 4 to be tested when it is opened for the test-actuation time "T," the other three fuel injectors 4 must be rigorously closed, but this indispensable condition is not limitative because in an internal-combustion engine 1 with four cylinders 3 the four fuel injectors 4 always inject at different times (each in a corresponding half revolution of the driving shaft to have four injections every two revolutions of the driving shaft) and, thus, except for exceptional cases, the overlapping of the two fuel injectors 4 that inject at the same time never occurs.

The estimate of the fuel quantity "Q" that is actually injected by the fuel injector 4 to be tested when it is opened for the test-actuation time "T" executed during the normal operation of the internal-combustion engine 1 differs from the similar estimate executed, as described above, at the end of the production line of the vehicle 28 because the fuel that is injected must always be adapted to the motion needs of the internal-combustion engine 1: during the normal operation of the internal-combustion engine 1, it is not possible to inject an fuel quantity significantly different from the optimal fuel quantity for the motion needs of the internal-combustion engine 1, otherwise the internal-combustion engine 1 would manifest operating irregularities that are not acceptable (the driver of the vehicle 28 would perceives such operating irregularities and image a fault or, even worse, a manufacturing defect). In other words, the fuel that is injected must firstly comply with the motion needs of the internal-combustion engine 1 and only later to the needs of determining of the estimates.

The first consequence of the respect of the motion needs of the internal-combustion engine 1 is that it is possible in each estimate (i.e., in each observation) to execute a very limited number "N" of consecutive openings of the fuel injector 4 to be tested with the same test-actuation time (no more than 5-8 consecutive openings when the test-actuation time is short and no more than one consecutive actuation when the test-actuation time is long). When the number "N" of consecutive openings of the fuel injector 4 to be tested with the same test-actuation time is small, the pressure drop "ΔP" in the common rail 5 during the opening of the fuel injector 4 to be tested is reduced, and, thus, its determination is very uncertain (because the pressure drop "ΔP" has an order of size similar to the order of size of the errors of the pressure sensor 10, the hydraulic and electric background noise, and the minimum resolution at which the electronic-control unit 9 reads the output of the pressure sensor 10). Being the pressure drop "ΔP" in the common rail 5 during the opening of the fuel injector 4 to be tested affected by considerable errors (that, in some unfortunate situations, may also reach 100% of the pressure drop "ΔP"), a high number of estimates (in the order to hundreds) of the fuel quantity "Q" that is actually injected by the fuel injector 4 to be tested when it is opened for the test-actuation time "T" must be executed.

Consequently, during the normal use of the internal-combustion engine 1, the electronic-control unit executes [over a long period of time (i.e., over hours of operation of the internal-combustion engine 1)] a series of estimates (in the order of thousands) of the quantity "Q" of fuel that is actually injected by the fuel injector 4 to be tested when it is opened for the same test-actuation time "T," and, thus, the electronic-control unit 9 statistically processes the series of estimates of the fuel quantity "Q" to determine the average fuel quantity "Q" that is actually injected by the fuel injector 4 to be tested when it is opened for the test-actuation time "T." Obviously, to determine the actual-injection law of a fuel injector 4 to be tested, the average fuel quantity "Q" is used that is actually injected by the fuel injector 4 to be tested when it is opened for the test-actuation time "T."

According to an embodiment, the electronic-control unit 9 determines the average fuel quantity "Q" that is actually injected by the fuel injector 4 to be tested when it is opened for the test-actuation time "T" by a moving average calculation applied to the series of estimates of the fuel quantity "Q."

According to an embodiment, the electronic-control unit 9 statistically processes the series of estimates of the fuel quantity "Q" to determine also a confidence index of the average fuel quantity "Q," in addition to the average fuel quantity "Q" that is actually injected by the fuel injector 4 to be tested when it is opened for the test-actuation time "T." Such a confidence index indicates to which extent the fuel quantity "Q" is "reliable" [i.e., accurate (corresponding to truth)] and the higher, the lower the maximum error in determining the average fuel quantity "Q." The electronic-control unit 9 uses the average fuel quantity "Q" to effectively actuate the injection of a fuel injector 4 (i.e., uses the average fuel quantity "Q" for updating the injection law of the fuel injector 4) only when the confidence index is higher than a predetermined acceptability threshold (i.e., only when the average fuel quantity "Q" is "sufficiently" reliable).

Obviously, as already described the actuation times "T" are chosen from a whole of the characteristic actuation times "t1," "t2," "t3," "t4" to determine the characteristic points "P1"-"P4" and, thus, reconstruct the actual-injection law of each fuel injector 4 by the two straight lines "R1" and "R2."

In use, the electronic-control unit 9 determines the desired fuel quantity "Qd" for each fuel injector 4 as a function of the engine control objectives and, thus, determines the desired actuation time "Td" of each fuel injector 4 as a function of the desired fuel quantity "Qd" using the stored injection law. Normally, each fuel injector 4 would be actuated using exactly the desired actuation time "Td." Instead, the actuation of the estimates the electronic-control unit 9 compares each test-actuation time "T" with the desired actuation time "Td" to establish whether at least one test-actuation time "T" is compatible with the desired actuation time "Td" and, thus, estimates the fuel quantity "Q" that is actually injected by the fuel injector 4 when it is opened for a test-actuation time "T" if such a test-actuation time "T" is compatible with the desired actuation time "Td."

A test-actuation time "T" is compatible with the desired actuation time "Td" if the fuel quantity "Q" injected with test-actuation time "T" is equal to a whole sub-multiple of the desired fuel quantity "Qd" injected with the desired actuation time "Td" minus a tolerance interval {i.e., if the fuel quantity "Q" injected in the test-actuation time "T" multiplied by a whole number [including number 1 (the test-actuation time "T" may be identical to the desired actuation time "Td")] is equal to the desired fuel quantity "Qd" injected in the desired actuation time "Td" minus a tolerance interval (it is evidently very difficult to obtain perfect equality without allowing a minor difference)}. Consequently, the estimated fuel quantity "Q" that is actually injected by a fuel injector 4 to be tested includes executing the number of openings of the fuel injector 4 to be tested needed to deliver the desired fuel quantity "Qd" (minus the tolerance interval) required by the engine control of the internal-combustion engine 1. In other words, if the fuel quantity "Q" injected with the test-actuation time "T" is one third of the desired fuel quantity "Qd" (i.e., the fuel quantity "Q" injected with the test-actuation time is a sub-multiple in the order of three of the desired fuel quantity "Qd"), then the estimate contemplates executing three consecutive openings of the fuel injector 4 with test-actuation time "T."

According to an embodiment, the tolerance interval is determined as a function of the confidence index of the average fuel quantity "Q" corresponding to the test-actuation time "T" being analyzed so that the tolerance interval is broader (i.e., it is either easier or more frequent to find the compatibility with the desired fuel quantity "Qd") when the confidence index is low (i.e., when many other estimates are indispensable to increase the confidence index) and that the tolerance interval is narrower [i.e., it is more difficult (less frequent) to find the compatibility with the desired fuel quantity "Qd"] when the confidence index is high (i.e., when other estimates are indispensable to increase the confidence index).

After having identified a compatible test-actuation time, minus the tolerance interval, with the desired actuation time "Td," the electronic-control unit 9 modifies the desired fuel quantity "Qd" required by the electronic-control unit 1 in the tolerance interval so that the average fuel quantity "Q" corresponding to the test-actuation time "T" is exactly a sub-multiple of the desired fuel quantity "Qd" (obviously, is possible the case in which the average fuel quantity "Q" corresponds to the test-actuation time "T" is identical to the desired fuel quantity "Qd"). If possible [i.e., if the internal-combustion engine 1 includes the punctual check of the opening of the intake valves (by the so-called "Multi-air" system)], the electronic-control unit 9 modifies a opening law of the intake valve (or intake valves) of the cylinder 2 in which the fuel injector 4 to be tested as a function of the change of the desired fuel quantity "Qd". In this manner, the combustion in such a cylinder 2 is always with the desired air/fuel ratio (also in the case of generating a torque slightly different from the desired motive torque by effect of the tolerance interval).

According to an embodiment, the electronic-control unit 9 distances in time two consecutive estimates of the fuel quantity "Q" that is actually injected from each other when both estimates require modifying (within the tolerance interval) the desired fuel quantity "Qd" required by the engine control of the internal-combustion engine 1. In other words, the electronic-control unit 9 avoids to execute in excessively short times an excessive number of modifications of the desired fuel quantities "Qd" required by the engine control of the internal-combustion engine 1 to avoid generating operating irregularities that can be perceived by a driver of the vehicle 28.

In other words, to execute an estimation of the fuel quantity "Q" injected with an actuation time "T" by a fuel injector 4 to be tested, the electronic-control unit 9 starting from the desired fuel quantity "Qd" required by the engine control of the internal-combustion engine 1 may decide to modify ("override") the injection features by varying both the desired fuel quantity "Qd" (within the tolerance interval), and by dividing the injection into several consecutive injections. It is worth noting that the modification ("overriding") of the injection features always and only occurs for only one fuel injector 4 to be tested each time while in the same injection cycle the other three fuel injectors 4 are working normally. Furthermore, in the tolerance interval that establishes the maximum variation of the desired fuel quantity "Qd" is limited minus one milligram of fuel. Consequently, the modification ("overriding") of the injection features does not generate significant effects, thus effects that are perceivable by a driver of the vehicle 28.

According to an embodiment, the electronic-control unit 9 privileges long desired actuation times "Td" for executing the estimate of the fuel quantity "Q" that is actually injected by the fuel injector 4 so that the average fuel quantity "Q" corresponding to the test-actuation time "T" is as frequently as possible a fraction of the desired fuel quantity "Qd" for executing several consecutive openings of the fuel injector 4 to be tested. In other words, the higher the number of consecutive openings of the fuel injector 4 to be tested, the higher the pressure drop "ΔP" in the common rail 5 and, thus, the higher the measuring accuracy of the pressure drop "ΔP." It is, thus, possible to use long desired actuation times "Td" (i.e., high desired fuel quantities "Qd") for executing estimates so as to execute several consecutive openings of the fuel injector 4 to be tested. To speed up calculating the average fuel quantity "Q," it is, thus, convenient to increase as much as possible the number of consecutive injections for each single fuel injector 4 to be tested for each estimate.

Figure 7:
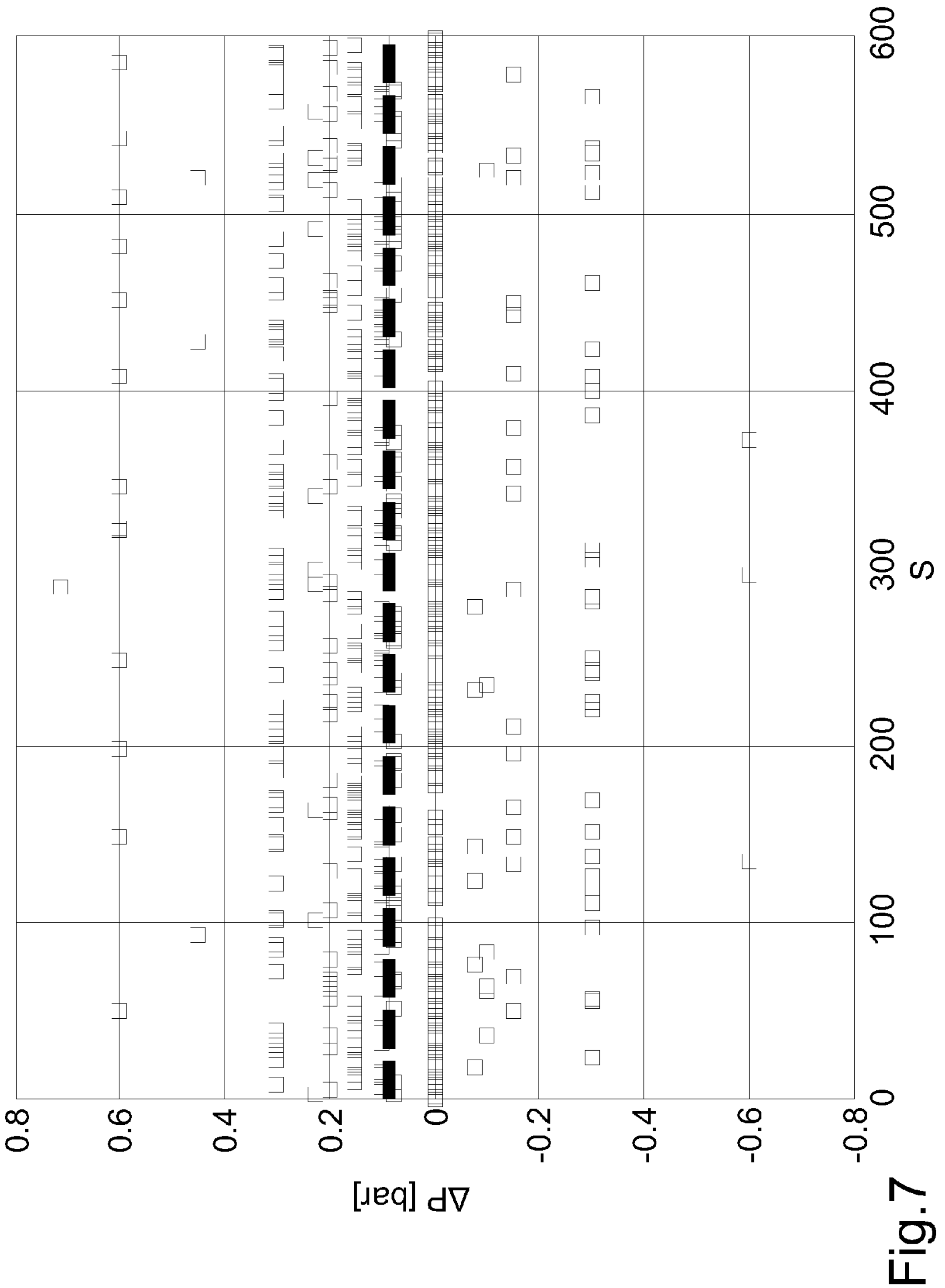
FIG. 7 is a graph that illustrates distribution of pressure drop measured in a common rail executed during normal operation of the internal-combustion engine.

The graph in FIG. 7 shows the distribution of the measurements of the pressure drop "ΔP" as a function of the number "S" of estimates that are executed. The dashed line shows the "real" value of the pressure drop "ΔP." It is worth observing that the measured pressure drop "ΔP" has a wide variability about the real value, and, thus, only by statistically processing a high number of estimates it is possible to obtain a good accuracy in the determination of the average fuel quantity "Q" that is actually injected by a fuel injector 4 to be tested when it is opened for a test-actuation time "T."

Figure 8:
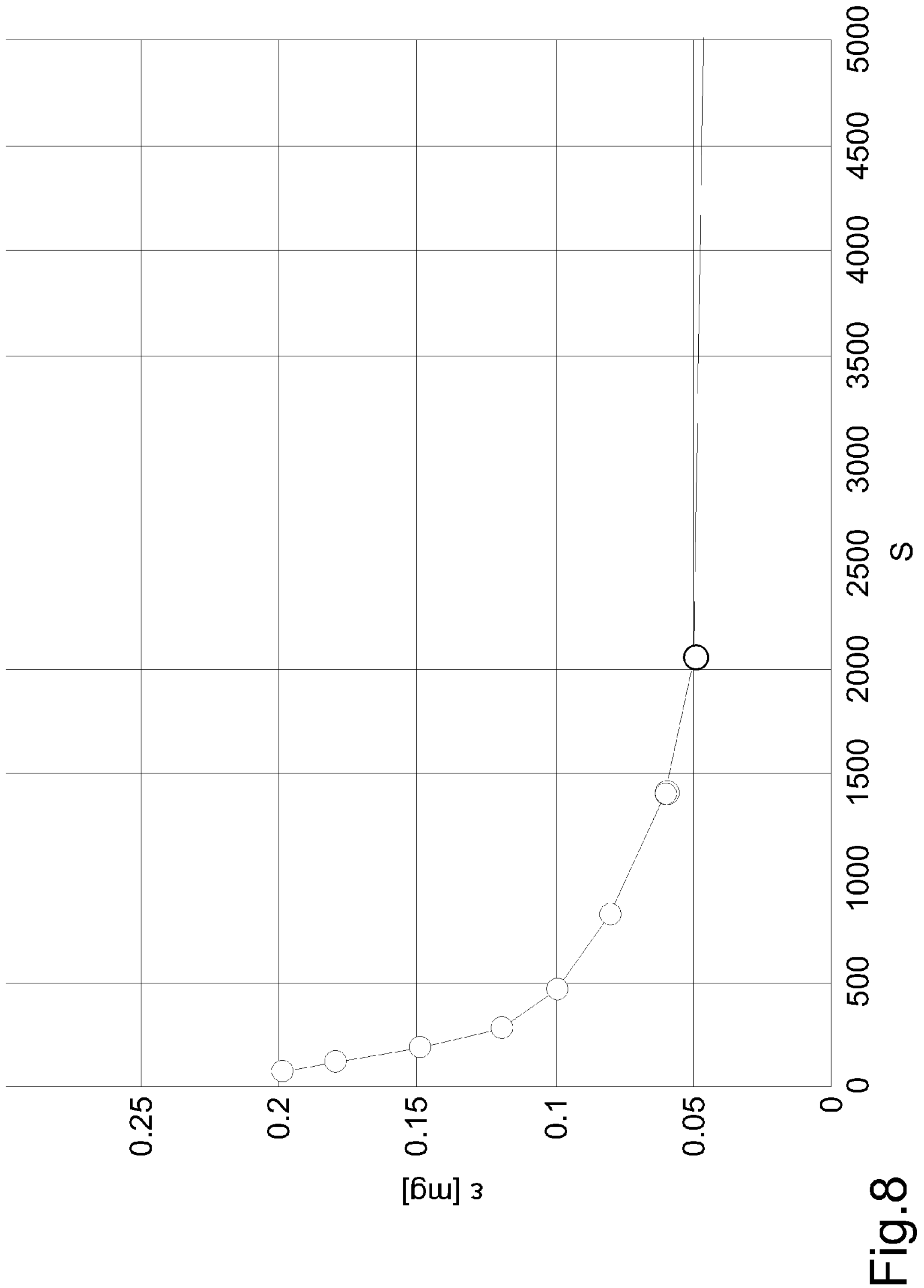
FIG. 8 is a graph illustrating evolution of error in estimation of quantity of injected fuel as a function of number of measurements that are used for determining the injection law.

The graph in FIG. 8 shows the evaluation of the error "ϵ" committed in the determination of the average quantity of fuel that is actually injected by a fuel injector 4 to be tested when it is opened for a test-actuation time "T" according to the number "S" of estimates that are executed (the error "ϵ" is inversely proportional to the confidence index). It is observed that the error "ϵ" is gradually reduced (i.e., the confidence index increases gradually) as the number of estimates "S" that are executed increases.

Figure 9:
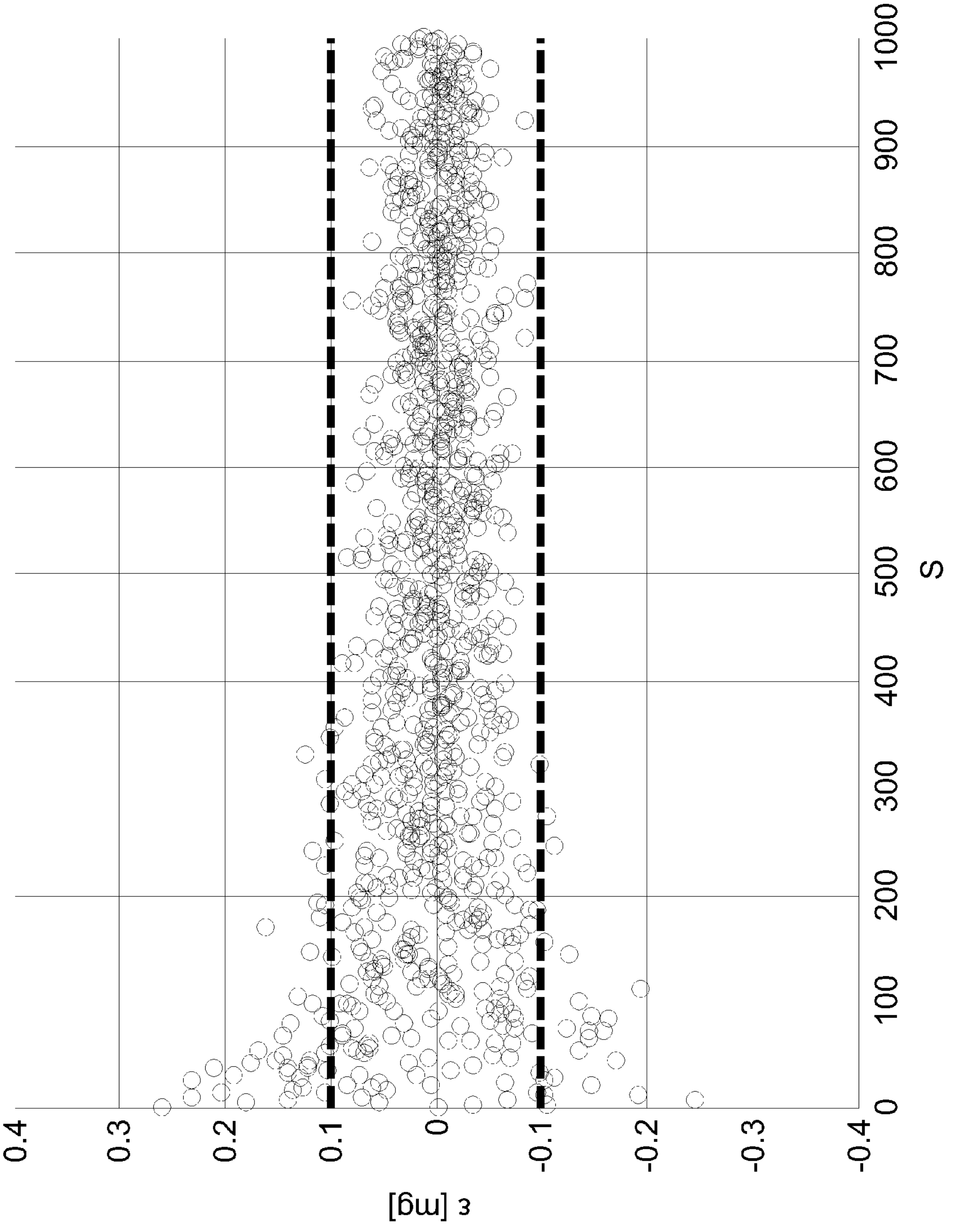
FIG. 9 is a further graph illustrating evolution of error in estimation of quantity of injected fuel as a function of number of measurements that are used for determining the injection law.

The graph in FIG. 9 shows the evaluation of the error "ϵ" committed in the determination of the average quantity of fuel that is actually injected by a fuel injector 4 to be tested when it is opened for a test-actuation time "T" according to the number "S" of estimates that are executed. It is worth noting that the error "ϵ" is included within ±0.1 mg already after a few-hundred estimates.

The above described method for determining the injection law of a fuel injector has many advantages. Firstly, the above described method for determining the injection law of an injector allows to identify with high accuracy the actual-injection law and, thus, allows to use the actual-injection law to control the combustion of the internal-combustion engine 1. In this manner, the combustion control of the internal-combustion engine 1 is very accurate in all engine points and, particularly, in the ballistic-operation area "B." It is worth noting that the fuel-injection accuracy is not reached by reducing the dispersion of the features of the injector (extremely complex and costly operation), but is reached by virtue of the possibility of knowing the corresponding actual-injection law (that may display a deviation even relatively high of the nominal-injection law) for each injector. Furthermore, the above described method for determining the injection law of a fuel injector is simple and cost-effective also in an existing electronic-control unit because no additional hardware is needed with respect to that normally present in the fuel injection systems and high calculation power and large memory capacity are not needed.

It should be appreciated by those having ordinary skill in the related art that the method has been described above in an illustrative manner. It should be so appreciated also that the terminology that has been used above is intended to be in the nature of words of description rather than of limitation. It should be so appreciated also that many modifications and variations of the method are possible in light of the above teachings. It should be so appreciated also that, within the scope of the appended claims, the method may be practiced other than as specifically described above.

What is claimed is:

1. A method for determining an injection law of a fuel injector (4) to be tested in an injection system (3) that includes a plurality of fuel injectors (4), a common rail (5) feeding fuel under pressure to the injectors (4), and a fuel pump (6) that keeps the fuel under pressure inside the common rail (5), said method being performed by an engine control unit and comprising the steps of:

completely interrupting the feeding of the fuel from the fuel pump (6) to the common rail (5);

avoiding opening of all of the fuel injectors (4) except for one of the fuel injectors (4) to be tested;

measuring initial pressure (Pi) of the fuel inside the common rail (5) before starting the opening of the fuel injector (4) to be tested;

opening the fuel injector (4) to be tested for a number (N) of consecutive openings with a same test-actuation time (T);

measuring final pressure (Pt) of the fuel inside the common rail (5) after ending the opening of the fuel injector (4) to be tested;

determining a pressure drop (ΔP) in the common rail (5) during the opening of the fuel injector (4) to be tested, which is equal to a difference between the initial pressure (Pi) and final pressure (Pf);

estimating, according to the pressure drop (ΔP) in the common rail (5), the total fuel quantity (Q) that has been actually injected by the fuel injector (4) to be tested during the openings with the same test-actuation time (T);

calculating a fuel quantity (Q) that is actually injected by the fuel injector (4) to be tested when the fuel injector (4) is opened for the test-actuation time (T) by dividing the total fuel quantity (Q) by the number (N) of openings; and causing an internal-combustion engine (1) using the injection system (3) to rotate by an external actuator during the openings of the fuel injector (4) to be tested to allow execution of a high number of consecutive openings of the fuel injector (4) to be tested with the same test-actuation time (T).

2. A method as set forth in claim 1, said method comprising a further step of keeping the internal-combustion engine (1) at a substantially constant rotational speed that is predetermined by the external actuator.

3. A method as set forth in claim 1, said method comprising a further step of using a motorized roller-test bench (29) to cause driving wheels (30) of a vehicle (28) incorporating the internal-combustion engine (1) to rotate.

4. A method as set forth in claim 1, said method comprising further steps of:

carrying out, in sequence and for the fuel injector (4) to be tested, a series of tests for different predetermined test-actuation times (T); and carrying out, in sequence, the series of tests for each fuel injector (4) of the injection system (3).

5. A method as set forth in claim 1, wherein said method comprises further steps of:

waiting for a first predetermined time interval between interruption of the feeding of the fuel from the fuel pump (6) to the common rail (5) and measurement of the initial pressure (Pi) inside the common rail (5) to obtain a pressure stabilization; and waiting for a second predetermined time interval between the ending of the opening of the fuel injector (4) to be tested and measurement of the final pressure (P0 inside the common rail (5) to obtain a pressure stabilization.

6. A method as set forth in claim 1, wherein said method comprises further steps of:

estimating a lost-fuel quantity that is lost by the common rail (5) due to either of leakage and actuation during the openings of the fuel injector (4) to be tested;

estimating, according to the pressure drop (ΔP) in the common rail (5), a gross-fuel quantity that has come out the common rail (5) during the openings of the fuel injector (4) to be tested; and calculating the total fuel quantity (Q) that is actually injected by the fuel injector (4) to be tested during the openings of the fuel injector (4) to be tested by subtracting the lost-fuel quantity from the gross-fuel quantity.

7. A method as set forth in claim 6, wherein said method comprises a further step of estimating the lost-fuel quantity according to the fuel pressure inside the common rail (5).

8. A method as set forth in claim 6, wherein said method comprises further steps of:

determining a first contribution that is directly proportional to a duration of a time interval that elapses between the two measurements of the fuel pressure inside the common rail (5);

determining a second contribution that is directly proportional to the number (N) of openings of the fuel injector (4) to be tested; and estimating the lost-fuel quantity by adding the first and second contributions.

9. A method as set forth in claim 1, wherein said method comprises further steps of:

establishing in a design phase a set of characteristic actuation times (t1, t2, t3, t4) that allow an accurate reconstruction of the injection law of the fuel injector (4); and choosing the test-actuation time (T) from the set of characteristic actuation times (t1, t2, t3, t4).

10. A method as set forth in claim 9, wherein said method comprises a further step of establishing four characteristic actuation times (t1, t2, t3, t4), two first characteristic actuation times (t1, t2) belonging to a ballistic-operation area (B) and being used to approximate the ballistic-operation area (B) with a first straight line (R1) and two second characteristic actuation times (t3, t4) belonging to a linear-operation area (D) and being used to approximate the linear-operation area (D) with a second straight line (R2) intersecting the first straight line (R1).

11. A method for determining an injection law of a fuel injector (4) to be tested in an injection system (3) that includes a plurality of fuel injectors (4), a common rail (5) feeding fuel under pressure to the injectors (4), and a fuel pump (6) that keeps the fuel under pressure inside the common rail (5), said method being performed by an engine control unit and comprising the steps of:

completely interrupting the feeding of the fuel from the fuel pump (6) to the common rail (5);

avoiding opening of all of the fuel injectors (4) except for one of the fuel injectors (4) to be tested;

measuring initial pressure (Pi) of the fuel inside the common rail (5) before starting the opening of the fuel injector (4) to be tested;

opening the fuel injector (4) to be tested for a number (N) of consecutive openings with a same test-actuation time (T);

measuring final pressure (Pt) of the fuel inside the common rail (5) after ending the opening of the fuel injector (4) to be tested;

determining a pressure drop (ΔP) in the common rail (5) during the opening of the fuel injector (4) to be tested, which is equal to a difference between the initial pressure (Pi) and final pressure (Pf);

estimating a lost-fuel quantity that is lost by the common rail (5) due to either of leakage and actuation during the openings of the fuel injector (4) to be tested;

estimating, according to the pressure drop (ΔP) in the common rail (5), a gross-fuel quantity that has come out the common rail (5) during the openings of the fuel injector (4) to be tested; and calculating a total fuel quantity (Q) that is actually injected by the fuel injector (4) to be tested during the openings of the fuel injector (4) to be tested by subtracting the lost-fuel quantity from the gross-fuel quantity estimating, according to the total fuel quantity (Q), a fuel quantity (Q) that is actually injected by the fuel injector (4) to be tested when the fuel injector (4) is opened for the test-actuation time (T);

causing an internal-combustion engine (1) using the injection system (3) to rotate by an external actuator during the openings of the fuel injector (4) to be tested to allow execution of a high number of consecutive openings of the fuel injector (4) to be tested with the same test-actuation time (T);

wherein estimating the lost-fuel quantity comprises further steps of: determining a first contribution that is directly proportional to a duration of a time interval that elapses between the two measurements of the fuel pressure inside the common rail (5); determining a second contribution that is directly proportional to the number (N) of openings of the fuel injector (4) to be tested; and estimating the lost-fuel quantity by adding the first and second contributions.

12. A method for determining an injection law of a fuel injector (4) to be tested in an injection system (3) that includes a plurality of fuel injectors (4), a common rail (5) feeding fuel under pressure to the injectors (4), and a fuel pump (6) that keeps the fuel under pressure inside the common rail (5), said method being performed by an engine control unit and comprising the steps of:

completely interrupting the feeding of the fuel from the fuel pump (6) to the common rail (5);

avoiding opening of all of the fuel injectors (4) except for one of the fuel injectors (4) to be tested;

measuring initial pressure (Pi) of the fuel inside the common rail (5) before starting the opening of the fuel injector (4) to be tested;

opening the fuel injector (4) to be tested for a number (N) of consecutive openings with a same test-actuation time (T);

measuring final pressure (Pt) of the fuel inside the common rail (5) after ending the opening of the fuel injector (4) to be tested;

determining a pressure drop (ΔP) in the common rail (5) during the opening of the fuel injector (4) to be tested, which is equal to a difference between the initial pressure (Pi) and final pressure (Pf);

estimating, according to the pressure drop (ΔP) in the common rail (5), a fuel quantity (Q) that is actually injected by the fuel injector (4) to be tested when the fuel injector (4) is opened for the test-actuation time (T); and causing an internal-combustion engine (1) using the injection system (3) to rotate by an external actuator during the openings of the fuel injector (4) to be tested to allow execution of a high number of consecutive openings of the fuel injector (4) to be tested with the same test-actuation time (T);

wherein said method comprises further steps of: establishing in a design phase a set of characteristic actuation times (t1, t2, t3, t4) that allow an accurate reconstruction of the injection law of the fuel injector (4); and choosing the test-actuation time (T) from the set of characteristic actuation times (t1, t2, t3, t4).

13. A method as set forth in claim 12, wherein said method comprises a further step of establishing four characteristic actuation times (t1, t2, t3, t4), two first characteristic actuation times (t1, t2) belonging to a ballistic-operation area (B) and being used to approximate the ballistic-operation area (B) with a first straight line (R1) and two second characteristic actuation times (t3, t4) belonging to a linear-operation area (D) and being used to approximate the linear-operation area (D) with a second straight line (R2) intersecting the first straight line (R1).

* * * * *